United States Patent [19]

Dilling

[11] Patent Number: 4,629,469
[45] Date of Patent: Dec. 16, 1986

[54] HUMECTANT COMPOSITION DERIVED FROM KRAFT BLACK LIQUOR

[75] Inventor: Peter Dilling, Isle of Palms, S.C.
[73] Assignee: Westvaco Corporation, New York, N.Y.
[21] Appl. No.: 786,860
[22] Filed: Oct. 11, 1985
[51] Int. Cl.$^4$ .............................................. C09B 67/00
[52] U.S. Cl. .......................................... 8/557; 8/526; 8/528; 8/589; 530/501
[58] Field of Search ...................... 8/557, 589; 530/501

[56] References Cited

U.S. PATENT DOCUMENTS

| | | | |
|---|---|---|---|
| 2,680,113 | 6/1954 | Adler et al. | 106/30 |
| 3,156,520 | 11/1964 | Blaisdell | 8/908 |
| 3,769,272 | 10/1973 | Hintz | 252/353 |
| 4,001,202 | 1/1977 | Dilling et al. | 8/650 |
| 4,007,004 | 2/1977 | Bailey et al. | 8/636 |
| 4,131,564 | 12/1978 | Dilling | 8/908 |
| 4,338,091 | 7/1982 | Dilling | 8/524 |
| 4,355,996 | 10/1982 | Dilling et al. | 8/561 |
| 4,521,336 | 6/1985 | Dilling | 530/501 |
| 4,534,771 | 8/1985 | Dilling | 8/524 |
| 4,551,151 | 11/1985 | Dilling | 8/524 |

Primary Examiner—A. Lionel Clingman
Attorney, Agent, or Firm—Terry B. McDaniel; Richard L. Schmalz

[57] ABSTRACT

Method of producing a by-product of the black liquor residue of a kraft wood pulping process having excellent product stability and exhibiting humectant properties in dyestuff compositions, and the resultant humectant product and dyestuff compositions containing such humectant product. The black liquor, after removal of tall oil fractions, is oxidized and thereafter treated with an aldehyde to methylolate the lignin components therein, the methylolated lignin-containing black liquor is treated with a sulfur-oxygen-containing compound, such as $SO_2$ gas, under sufficient conditions to sulfomethylate and solubilize the lignin components, and the resultant composition is concentrated to a solids content of from about 50% to up to about 70% at a pH of approximately 7.5 to produce the final humectant product.

14 Claims, 1 Drawing Figure

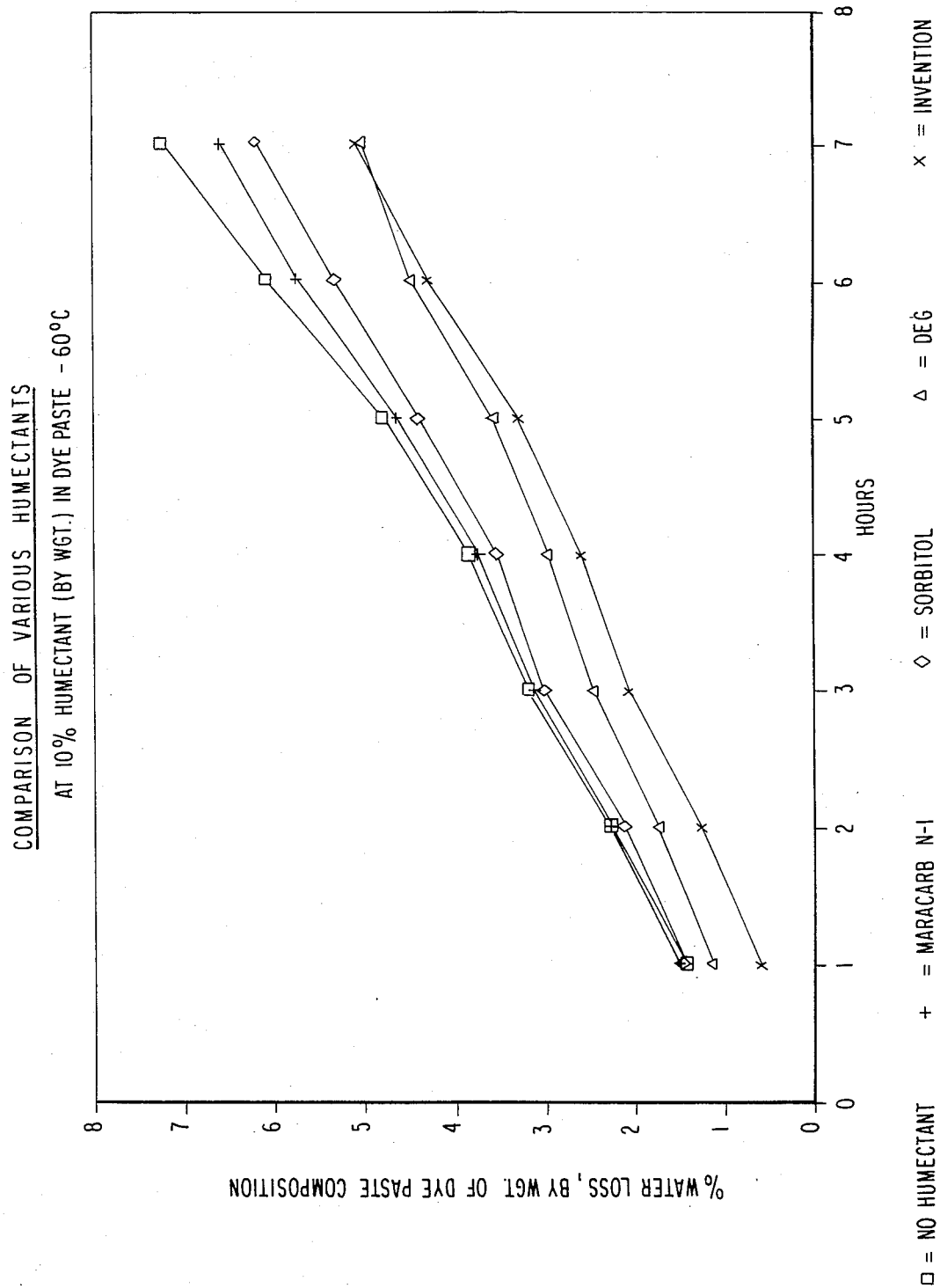

HUMECTANT COMPOSITION DERIVED FROM KRAFT BLACK LIQUOR

This invention relastes to a process of producing useful chemical compositions from the black liquor residue of a kraft pulping process employed in the paper-making industry, and, more particularly, to such a process and resulting products particularly suited for use as a humectant in dyestuff compositions.

BACKGROUND OF THE INVENTION

Dyestuff compositions in the form of a dye paste, or cake, typically contain as major constituents a dispersed dye or vat dye, a dispersant, and a filler, or diluent. Fillers or diluents basically are ingredients to dilute a milled dyestuff composition to a certain color value or dye strength which is accepted as a standard and which do not interfere with the dispersion phenomena of the dyestuff in use. Such dyestuff formulations also generally contain a humectant which is employed in the liquid dye paste, or cake, to prevent the dye from drying out, such as may occur around the edges of a dye drum. Without a humectant, the dry dye material would flake back into the container resulting in insoluble particles and higher local dye concentrations which subsequently produce an uneven distribution of color bodies in cloth dyeing and a specking appearance.

In the past, dyestuff fillers have been produced from the spent liquor resulting from the sulfite pulping of wood, as disclosed in U.S. Pat. No. 3,156,520 to Blaisdell. More expensive organic materials, such as napthalene sulfonates, also have been employed as fillers in dyestuff compositions. Recently, it has been proposed to provide a dyestuff filler having humectant properties as a by-product of a kraft pulping process employed in the paper-making industry. Commonly assigned U.S. Pat. No. 4,007,004 describes a process for treating kraft black liquor to remove a substantial amount of the lignin portion and to stabilize the material against fiber staining and dye reduction to make it suitable as a filler in dyestuff compositions. In particular, the patent describes a process wherein kraft black liquor residue is acidified to a pH of about 9 to 10 to form a lignin precipitate and a filtrate, the filtrate is separated from the lignin precipitate and treated with a solubilizing agent, such as sulfur dioxide, to solubilize the remaining lignin, and the filtrate is thereafter oxidized to stabilize the filtrate. The stabilized filtrate is heated to evaporate water and obtain a final product having a solids content of about about 40% to 65%. The resultant filtrate material is then used as an aqueous solution, or the aqueous filtrate may be further concentrated by spray-drying to yield a solid filler material.

Although the filler materials produced in accordance with the process described in U.S. Pat. No. 4,007,004 function exceptionally well in dyestuff formulations to provide good humectancy with low fiber staining and low azo dye reduction, the storage shelf life of such products is limited. In particular, the liquid filler products contain substantial amounts of inorganic salts, e.g., $Na_2SO_3$, which tend to crystalize under extended periods of storage at low temperatures, reducing the stability of the liquid filler product and its usefulness in dyestuff compositions. Salt crystalization of inorganic matter components causes settling in the humectant product with storage. The abundance of inorganic matter also causes thickening of the dye paste which results in loss of fluidity. As to the solid filler products produced in accordance with U.S. Pat. No. 4,007,004, such products quickly absorb moisture under normal conditions of humidity, and thus must be carefully stored and contained to preserve their value as a filler/humectant in the dyestuff compositions.

BRIEF OBJECTS OF THE INVENTION

It is an object of the present invention to provide a chemical composition suitable for use as a humectant in dyestuff and other similar chemical formulations which is produced from the black liquor residue of a kraft pulping process.

It is another object to provide an economical method of producing a chemical composition suitable for use as a humectant from the black liquor residue of a kraft pulping process.

SUMMARY OF THE INVENTION

The present invention is directed to the production of a chemical composition suitable for use as a humectant, particularly in dyestuff compositions, to provide prolonged shelf life under conditions of storage. The product is produced by treatment of the black liquor residue of a kraft pulping process. The black liquor, after normal removal of tall oil fractions, is oxidized and thereafter treated with an aldehyde to methylolate the lignin components therein. In the absence of a lignin preoxidation step, methylolation does not occur sufficiently for subsequent sulfonation reactions. The methylolated lignin-containing black liquor residue is then treated with a sulfur-oxygen-containing compound, such as $SO_2$ gas, under sufficient conditions to sulfomethylate and solubilize the lignin component thereof. The resultant black liquor composition then is concentrated to a solids content of from about 50% to up to 70% at a pH of approximately 7.5 to produce a final product suited for use an a humectant in dyestuff formulations.

BRIEF DESCRIPTION OF THE DRAWING

The accompanying drawing illustrates, in graph form, a comparison of the water-retention properties of the huemctant products of the present invention in dye paste compositions with similar dye paste compositions containing known humectants of the prior art.

DETAILED DESCRIPTION OF PREFERRED EMBODIMENTS

The present invention is directed to the production of a chemical composition from the black liquor residue of a kraft pulping process for use as a humectant in dyestuff and similar compositions. In distinction to the humectant filler compositions produced in accordance with the teachings of aforesaid U.S. Pat. No. 4,007,004, the products of the present invention are made from the black liquor residue of the kraft pulping process without the necessity of removal of the lignin components therefrom. In addition to possessing acceptable low fiber staining, heat stability, and humectant properties, the products of the present invention have good dispersion characteristics in dyestuff compositions and prolonged shelf life of such compositions under conditions of storage at low temperatures.

For a number of years, the lignin by-products of a kraft pulping process have contributed substantially as primary dispersants in dye compositions, printing pastes, and the like. As disclosed in U.S. Pat. No. 4,007,004, it was discovered that the residual components of the black liquor, after lignin removal, could also be employed as a dyestuff filler having humectant properties with the ennumerated benefits obtained therefrom. By the means of the present invention, a chemical composition having good humectant properties can be made from the kraft black liquor residue without removal of any lignin consitituents therefrom. As such, the process is more economical and readily adaptable to existing kraft pulping operations in the paper-making industry. The humectant properties of the present products are very good, despite the fact that the black liquor product contains less amounts of the hydroscopic saccarinic acids in the liquor, on the basis of total product weight, than that of the prior art product. Since the new humectant contains about 30% lignin, the product exhibits excellent dyestuff product grinding and dispersing performances. However, since the lignin portion exhibits such a high degree of sulfonation, it does not possess significant heat stability porperties. On the other hand, addition of the humectant to a heat stabile dyestuff composition does not significantly change the dispersibility and heat stability of the original composition.

It has been observed that dispersed dye compositions containing the humectant of the present invention also exhibit a pseudo-plastic phenomenon which provides improved storage of the liquid dyestuff composition. More specifically, the humectant in combination with the dispersed dye forms a gel-like structure which prevents sedimentation of dye particles during storage of the liquid dye composition. When shear is applied to the dye composition, the gel structure breaks to provide resultant flow characteristics similar to dyestuff compositions containing a conventional pure lignin dispersant. The pseudo-plastic composition shows a drastic viscosity decrease when the shear rate is increased from low to high levels. Thus, the extent of pseudo-plasticity can be controlled effectively by the amount of humectant added to the system, i.e., the higher the quantities of humectant added, the better the pseudo-plastic performance will be.

The process steps of the present invention may be described, as follows:

(1) A kraft black liquor residue having a solids concentration of, for example, about 39%, is oxidized by treatment with air until the measured residual sodium sulfide ($Na_2S$) content is about 2% or less. A temperature of 60° C.-75° C. is maintained during the oxidation reaction. This oxidation reaction minimizes interferences and facilitates subsequent lignin sulfonation.

(2) An aldehyde compound, e.g., 0.5-8 moles of formaldehyde, preferably 4 moles, per 1000 grams of lignin contained in the black liquor, is added to the black liquor and the temperature of the liquor maintained between 40° C.-80° C., preferably at about 70° C., for from 0.5 to 8 hours, preferably four hours.

(3) The pH of the methylolated liquor is adjusted with from about 0.8 to 6 moles sulfur dioxide gas per 1000 grams of lignin solids, preferably 3 moles, to a pH of between about 2 to 10.0 (preferably about 6.3), and formaldehyde in an amount equal to any residual amount of sodium sulfite in the liquor is added to form a soluble organic sodium salt therewith.

(4) The liquor is heated to 95° C. at atmospheric pressure for from about 5 to 20 hours, preferably for about 8 hours, or is heated under superatmospheric pressure, e.g., autoclaved, between about 105° C.-180° C., preferably 140° C., for about two hours to sulfomethylolate and thus solubilize the lignin therein.

(5) The liquor is heated to evaporate water and obtain a desired solids concentration of from about 50% up to as high as 70%. Glacial acetic acid is added to adjust the pH of the liquor to a pH of about 7.5 (generally the preferred pH for use as an additive in dyestuffs).

As starting material, black liquor from a kraft pulping process, or a more purified Kamyr pine black liquor, can be effectively utilized. Initially, the liquor is oxidized. Oxidation can be accomplished economically by treatment with air containing oxygen. Of course, oxygen or other oxidizing agents can be used. The degree of oxidation is determined by monitoring the sodium sulfide ($Na_2S$) content of the liquor, with reduction of Na2S from an initial level of about 6% to 8%, to 2% or less.

Methylolation of the lignin aromatic ring adjacent to the phenolic group of the black liquor may be accomplished by treatment with an aldehyde compound, such as formaldehyde ($CH_2O$), under sufficient conditions to prepare the lignin for solubilization at neutral and acid pH levels by treatment with the sulfur-oxygen-containing compound.

The improvements and advantages of the humectant products of the present invention in dyestuff compositions are illustrated by testing the humectant products of the present invention in dyestuff compositions containing a primary lignin dispersant to compare dispersibility, heat stability, and pseudo-plastic behavior, with and without humectant added. Comparisons were made with dye paste compositions containing a primary lignin dispersant and other humectant additives for water retention.

To test for heat stability, selected dye compositions containing varying amounts of the humectant product of the present invention and a sodium lignosulfonate salt dispersant of the prior art were prepared, as follows: Compositions consisting of 50 grams of dyestuff, 35 grams of a sodium lignosulfonate salt dispersant (REAX 85, a product of Westvaco Corporation), 125 ml. of water, and 5 drops of ethylenediaminetetracetic acid (1% solids at pH 10.0–10.5) were prepared and the pH of each composition adjusted to 8, with to the point where the filter test for disperse dye was passed. To 1 gram of each solid dye composition was added 250 milliliters of water, the solution boiled for fifteen minutes, and then filtered through a tared Watman filter paper no. 2 above a no. 4 paper (with vacuum), as specified in the standard American Association of Textile Chemists and Colorists (AATCC) heat stability test. The time for the filtration was recorded, the filter paper dried, and the residual material remaining on the filter was calculated by weight and visually observed.

To test for dispersibility, dye compositions containing additives as indicated above were prepared in accordance with the procedures for the heat stability test, except that the water and dye composition mixture was not heated, but was slurried, and then filtered through the filter paper arrangement indicated. The time for completion of the filtration of the aqueous dye composition was recorded.

Pseudo-plastic behavior of the dye/additive compositions was determined by visual observation of the compositions under conditions of shear created by agitation stirring of the same.

The humectant products of the present invention in dye paste compositions containing the primary lignin salt dispersant were tested for water weight loss of the compositions after various storage times, and compared with dye paste compositions containing the primary lignin salt dispersant and equivalent amounts of known humectants of the prior art, with the comparisons shown in the graph of the accompanying drawing.

A comparison of the performance data of the humectant products of the present invention for dispersibility, heat stability, and pseudo-plastic behavior, are set forth in the following table:

PERFORMANCE DATA ON HUMECTANT PRODUCT

| Product | | Dispersion (Filtration Time - Sec.) | Heat Stability (Filter Residue mg) | Psuedo Plastic Behavior |
|---|---|---|---|---|
| DYESTUFF, C.I. Blue 118 | | | | |
| Sodium Lignosulfonate Salt Dispersant (REAX 85) with no humectant | | 10.1 | 12.0 | None |
| Sodium Lignosulfonate Salt (REAX 85) | + Humectant (10%) | 9.8 | 11.2 | Slight |
| | + Humectant (30%) | 11.0 | 8.8 | |
| | + Humectant (50%) | 12.0 | 8.1 | |
| Humectant Alone (no primary dispersant) | | 39.8 | 490.0 | Very Strong |
| DYESTUFF, C.I. Red I | | | | |
| Sodium Lignosulfonate Salt Dispersant (REAX 85) with no humectant | | 10.0 | 10.8 | None |
| Sodium Lignosulfonate Salt (REAX 85) | + Humectant (10%) | 8.8 | 7.0 | None |
| | + Humectant (30%) | 11.0 | 6.2 | |
| | + Humectant (50%) | 12.0 | 7.0 | |
| Humectant Alone (no primary dispersant) | | 10.7 | 11.0 | Strong |

As shown in the graph drawing, water retention of a dye paste composition containing REAX 85 primary dispersant and the humectant product of the present invention were compared with similar dye paste compositions heated to 60° C. and containing REAX 85 and no humectatn, sorbitol, diethyleneglycol, and Maracarb N-I (a sodium lignosulfonate salt of a sulfite pulping process, manufactured by Reed Company), as humectants. The results thereof are expressed in percentage weight loss of water from the dye paste compositions after varying periods of storage.

From the foregoing results of the performance data of the humectant of the present invention for dispersibility, heat stability, and pseudo-plastic behavior, and with other humectants for water retention, it can be seen that the humectant of the present invention does not detract from dispersibility, and heat stability of dye stuff compositions containing sodium lignosulfonate salt dispersants when used alone, and provides reduced water loss during storage of dye paste compositions containing the same primary dispersant and humectants of the prior art.

That which is claimed is:

1. A method of producing a chemical composition suited for use as a humectant in dyestuff and similar formulations comprising the steps of:
   (a) oxidizing the black liquor residue of a kraft pulping process;
   (b) methylolating the lignin components of the oxidized liquor residue;
   (c) adding sulfur dioxide to the methylolated lignin containing oxidized lignin residue to adjust the pH of the residue to a pH range of between about 2 to 10;
   (d) adding equal molar quantities of formaldehyde to the amount of any residual sodium sulfite in the residue;
   (e) heating the resultant residue under sufficient conditions to sulfomethylate the lignin components of the residue; and
   (f) concentrating the residue to a solids content of between about 50% to 70% and adjusting the pH to about 7.5.

2. The method as defined in claim 1 wherein the black liquor is oxidized until the sodium sulfide content therein is less than about 2%.

3. The method as defined in claim 1 wherein the black liquor residue is methylolated by treatment with from 0.5 to 8.0 moles of formaldehyde per 1000 grams of lignin present in the residue.

4. The method of claim 3 wherein the black liquor residue is methylolated by treatment with 4.0 moles of formaldehyde per 1000 grams lignin present in the residue.

5. The method as defined in claim 3 wherein the black liquor is methylolated at a temperature of from about 40° C. to about 80° C. for from 0.5 to 8 hours.

6. The method of claim 5 wherein the black liquor is methylolated at a temperature of about 70° C. for about 4 hours.

7. The method as defined in claim 7 wherein the gas is added to the liquor residue in an amount of from about 0.8 to about 6 moles per 1000 grams of lignin solids present in the residue.

8. The method of claim 1 wherein the gas is added in an amount of about 3 moles per 1000 grams of lignin solids present in the residue.

9. The method as defined in claim 1 wherein the lignin components of the residue are sulfomethylated by heat treatment at superatmospheric pressure for about 2 hours at between about 105° C.–180° C.

10. The method of claim 9 wherein the sulfomethylation heat treatment is conducted at about 140° C.

11. The method as defined in claim 1 wherein the wherein the lignin components of the residue are sulfomethylated by heat treatment at atmospheric pressure at about 95° C. for from about 5 to 20 hours.

12. The method as defined in claim 11 wherein the sulfomethylation heat treatment is conducted for about 8 hours.

13. A humectant product produced by the method of claim 1.

14. A dyestuff composition containing a dyestuff, a primary lignin dispersant, and a humectant product produced by the method of claim 1.

* * * * *